(No Model.)

A. N. PARRY.
CARRIAGE.

No. 476,298. Patented June 7, 1892.

Witnesses:
Eugene Humphrey
Clara L. Power

Inventor:
Augustus N. Parry
by T. W. Porter, Atty.

UNITED STATES PATENT OFFICE.

AUGUSTUS N. PARRY, OF AMESBURY, MASSACHUSETTS.

CARRIAGE.

SPECIFICATION forming part of Letters Patent No. 476,298, dated June 7, 1892.

Application filed April 1, 1892. Serial No. 427,415. (No model.)

*To all whom it may concern:*

Be it known that I, AUGUSTUS N. PARRY, of Amesbury, in the county of Essex and State of Massachusetts, have invented a new and useful Improvement in Carriages, which will, in connection with the accompanying drawings, be hereinafter fully described, and specifically defined in the appended claim.

Figure 1:
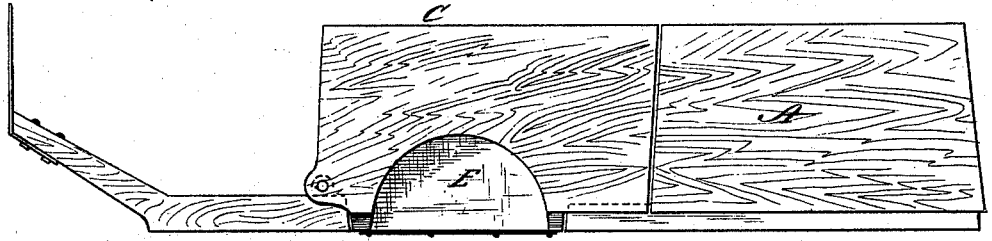
Figure 2:
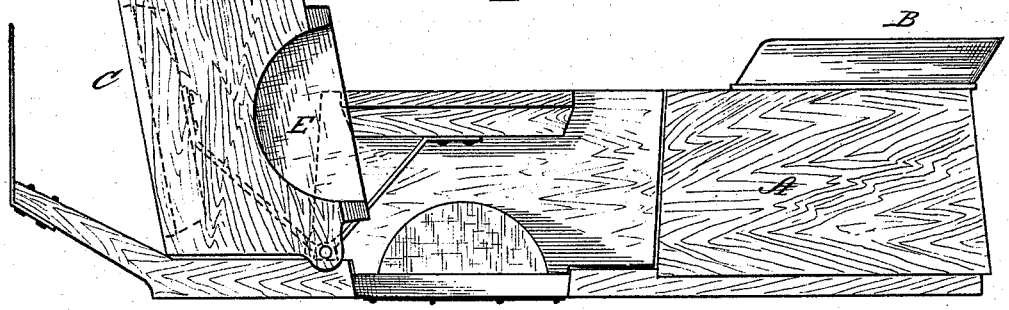
Figure 3:
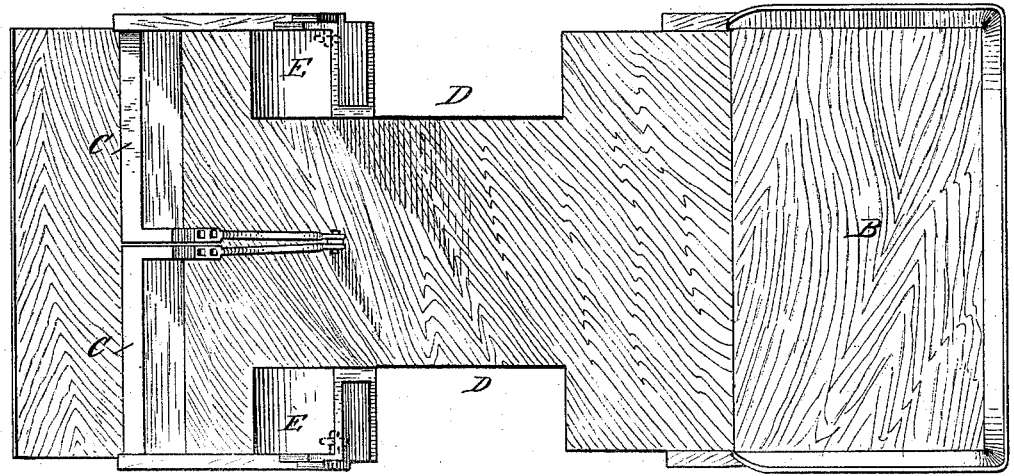

In said drawings, Figure 1 is a side elevation of a carriage-body and front seat embodying my invention. Fig. 2 is a view like Fig. 1, except that one-half of the front seat is turned forward and the rear seat is in place; and Fig. 3 is a top plan view of a carriage-body with the seats attached and the front seats turned forward.

The object of my invention is to provide a carriage which can be turned within practically the same compass as a carriage having a full wheel-house, and which yet has a wheel-house only upon each side, which extends inwardly from the door a limited distance, and which is raised when the door is opened, so that the passenger when entering or leaving the carriage is in no respect obstructed by a wheel-house that projects into the body.

Referring again to said drawings, A is the body; B, the rear seat, and C C the sections of the front seat. At the sides of the body are formed recesses D D, into one of which a forward wheel will enter when the carriage is turned, according as it is turned to the right or the left. For the purpose of fully opening said recesses when the sections of the front seat are opened and of closing them when the front seat closes I form upon the sections of the front seat the short wheel-houses E, which extend inwardly only to the limited extent shown in Fig. 3, all of the space between the same being of the general level of the floor. The front sections E of the seat are pivoted to the body in a common and well-known manner, and having the sections E of the wheel-house formed upon them they take the same forward when they are jumped to that position.

As all carriages which have a permanent wheel-house extending entirely across the body must have the front wheels checked in their cut-under movement when the wheels are at about right angles to the axial line of the body, therefore with a narrow wheel-house, like that shown by me, I can turn the carriage within a space exceeding by but three inches that required by the said ordinary wheel-house, and yet I have over half of the width of my body in level floor-space. Besides this, when the door is opened the entire space D is clear of obstructions, so that it greatly facilitates entering and leaving the carriage.

It will be obvious that the front seat may be formed in one part only, with sections E joined thereto, as now shown; but the method of dividing the front seat, as shown in the drawings, is greatly to be preferred.

I claim as my invention—

A two-seated carriage formed with the side recesses D and the short wheel-houses E to cover said recesses, formed upon the front seat and arranged to turn forward, substantially as specified.

AUGUSTUS N. PARRY.

Witnesses:
GEORGE H. BRIGGS,
DELL W. DOLBIER.